United States Patent [19]

Buhrer

[11] 3,806,901

[45] Apr. 23, 1974

[54] RAPID ACCESS CYLINDRICAL MAGNETIC DOMAIN MEMORY

[75] Inventor: Carl F. Buhrer, Framingham, Mass.

[73] Assignee: GTE Laboratories, Incorporated, Waltham, Mass.

[22] Filed: Aug. 2, 1972

[21] Appl. No.: 277,244

[52] U.S. Cl. ...................... 340/174 TF, 340/174 SR
[51] Int. Cl. ........................ G11c 19/00, G11c 11/14
[58] Field of Search ............................... 340/174 TF

[56] References Cited

UNITED STATES PATENTS

| | | | |
|---|---|---|---|
| 3,701,132 | 10/1972 | Bonyhard et al. | 340/174 TF |
| 3,618,054 | 11/1971 | Bonyhard | 340/174 TF |
| 3,670,313 | 6/1972 | Beausoleil | 340/174 TF |

*Primary Examiner*—James W. Moffitt
*Attorney, Agent, or Firm*—Irving M. Kriegsman

[57] ABSTRACT

A cylindrical magnetic domain memory is described using a plurality of main storage domain circulating loops around an auxiliary loop. A single cylindrical domain detector operatively oriented at the bits circulated in the auxiliary loop provides an output signal of those domain bits accessed from the main storage loops and after their transfer to the auxiliary loop. A reduction of access time is obtained by simultaneously transferring a selected number of predetermined bits from the main storage loops to the auxiliary loop. The bit length of the auxiliary loop and transfer tracks are selected so that after any number of circulations around the auxiliary loop, all bits can be returned in predetermined bit positions in the main storage loops.

8 Claims, 8 Drawing Figures

RAPID ACCESS CYLINDRICAL MAGNETIC DOMAIN MEMORY

This invention relates to a data processor memory utilizing traveling cylindrical magnetic domains. More specifically, this invention relates to the organization of a magnetic cylindrical domain memory.

BACKGROUND OF THE INVENTION

Magnetic domain memory devices are known as, for example, described in the patents to Shafter U.S. Pat. Nos. 3,493,940 and 3,493,946. In recent years, extensive investigations of magnetic domain behavior in single-crystal magnetic oxides have been made. Of particular interest in these investigations has been the behavior of cylindrical magnetic domains, also known as "bubbles," and the means by which these may be propagated in a controlled manner. A recent article dealing with cylindrical domains entitled "Application of Orthoferrites to Domain-Wall Devices" by Andrew H. Bobeck et al. appeared in the IEEE Transactions on Magnetics, Vol. MAG-5, No. 3, of September, 1969 at page 544.

As described in this article, cylindrical magnetic domains can be created and moved about within orthoferrites by subjecting such material to selectively controlled magnetic fields. The bubbles can be manipulated and moved in discrete steps with a variety of techniques which utilize particular characteristic behavior of the bubbles in a thin platelet of orthoferrite. For example, cylindrical domains tend to move in the direction where a transverse bias magnetic field has a reduced intensity. By utilizing a particular pattern of conductors over a cylindrical domain producing orthoferrite material, the bubbles can be moved about in discrete steps with current pulses sent in a controlled sequence over the conductor patterns. Bubbles also are attracted or repulsed by magnetic poles, and one technique for moving the bubbles utilizes an overlay bar pattern of easily magnetized and demagnetized materials to circulate the domains under action by an in-plane rotating magnetic field. Cylindrical domains also can be controllably increased or decreased in size by varying the intensity of the transverse bias magnetic field. As a result, their movement can be controlled with highly permeable patterns which are shaped to form asymetrical energy traps known as angelfish circuits to define discrete domain locations.

All these techniques rely upon the circulation of domains in discrete steps to produce a memory for strong information. The complexity of circulating and controlling the cylindrical domains may be appreciated when it is realized that their dimensions may be of the order of 0.0001 inches and as many as $10^6$ may be accommodated on a single platelet of about 1 square inch in area.

When that many cylindrical domains are used on a single platelet, a problem arises in providing sufficiently rapid access to accommodate high speed data processors. The schemes proposed for employing cylindrical domains, however, rely upon the storage of domain information in long circulating paths, thus requiring long average access time to the information.

SUMMARY OF THE INVENTION

In a cylindrical magnetic domain memory in accordance with the invention, the memory is organized with a plurality of main storage domain circulating loops around an auxiliary loop to provide rapid access to the stored information. When either a reading or updating of the stored information is desired, a switch signal is applied to the memory at the appropriate times to cause a selected group of domains in each of the main storage circulating loops to be transferred to the auxiliary loop. The transferred domains are then circulated around the auxiliary loop past a read-out or an updating circuit after which the group of domain positions are returned to each of their original locations in the main storage loops.

The auxiliary loop is coupled for two-way flow of domains with each of the main storage loops. The bit length of the auxiliary loop (i.e., the number of domain positions that make up its entire length) is preferably selected to accommodate the sum total of the domain positions that are transferred from main storage loops. In this manner, the total access time is kept low and constitutes the sum of the time periods needed to (*a*) transfer domain positions to the auxiliary loop, (*b*) circulate the domain positions around the auxiliary loop, and (*c*) return the domain positions to the main storage loops.

The improvement in access time of a cylindrical magnetic domain memory in accordance with the invention may be particularly appreciated in comparison with the access time needed for a single shift register of cylindrical magnetic domains. The average access time for a 4,096 word single shift register memory of 32 bits per word would be 65,536 clock periods. In a cylindrical magnetic memory in accordance with the invention, the access time may be reduced by a factor of about 40.

It is, therefore, an object of the invention to provide a cylindrical domain memory capable of producing rapid access with high bit storage capability. It is further an object of the invention to provide a cylindrical domain memory with improved switching for rapid access of data with a minimum of electrical input circuits and cylindrical domain detectors.

BRIEF DESCRIPTION OF DRAWINGS

These and other advantages and objects of the invention will be understood from the following description of a rapid access cylindrical domain memory in accordance with the invention, described in conjunction with the drawings wherein.

DETAILED DESCRIPTION OF EMBODIMENT

Figures 1, 2:
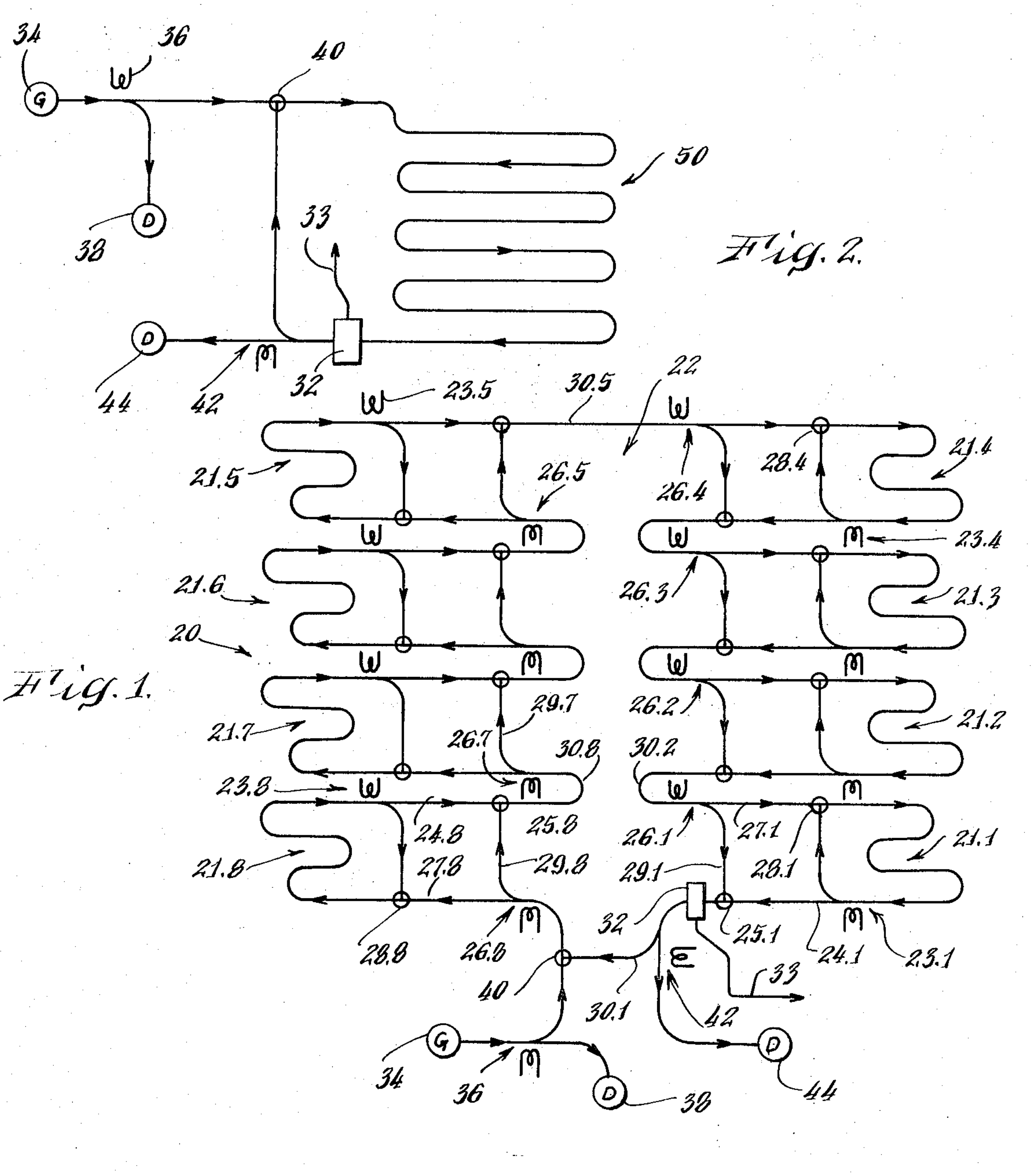
FIG. 1 is a schematic representation of a cylindrical domain memory in accordance with the invention.
FIG. 2 is a schematic representation of a conventional cylindrical domain memory.

With reference to FIG. 1, a cylindrical magnetic memory 20 is shown formed of a plurality of main storage loops 21.1–21.8 surrounding an auxiliary loop 22. Main storage loops 21 and auxiliary loop 22 circulate cylindrical magnetic domains in a clockwise direction as indicated by the arrow heads. Each main storage loop 21 is provided with an output switch 23 for transferring domains to the auxiliary loop 22 along a transfer track 24 and through an OR gate 25. The auxiliary loop 22 is provided with switches 26 to transfer domains to the main storage loops 21 along transfer tracks 27 and through OR gates 28.

Auxiliary loop 22 is formed of paths 29 and 30 connecting switches 26 and OR gates 25 and passes a domain detector 32 having an output line 33. A cylindrical domain generator 34 is provided and connected by switch 36 to either a domain disposer 38 or auxiliary loop 22 at an OR gate 40. A switch 42 connects auxiliary loop 22 to a domain disposer 44 for the removal of domains to, for example, update the data bits in the main storage loops 21.

In the operation of cylindrical domain memory 20, the permanently stored bits occupy cylindrical domain positions in the main storage loops 21 around which the domains are circulated. The auxiliary loop 22, however, remains free of domains while domains from generator 34 flow past switch 36 into disposer 38.

When, for example, a particular 64 bit word is to be read, a program control (not shown) energizes switches 23.1–23.8 at just the right moments to enable 8 bits from each storage loop 21 to be transferred to auxiliary loop 22. All 64 bits are then moved past detector 32, disposal switch 42 and update point at OR gate 40. If no change in the word is desired, it is circulated until all sets of 8 bits are at a switch 26 for return to main storage loops 21. The program control actuates switches 26 at the right instants to obtain the return of the bits.

If a word needs to be updated, then disposal switch 42 is actuated at the proper time to send domains to disposer 44, while update switch 36 is actuated to divert domains from generator 34 to the auxiliary loop at OR gate 40. The actuation of switches 36 and 42 are so controlled in time to assure that domains for updating will arrive at OR gate 40 just in time to occupy the proper bit positions which were previously vacated at switch 42.

The advantage of the cylindrical domain memory 20 in providing an improved access time may be appreciated by comparison with the conventional single circulating main storage loop 50 in FIG. 2. In the domain memory of FIG. 2, a domain generator 34, detector 32 and disposer 44 as in FIG. 1 are provided to update and detect the information stored in loop 50. Loop 50 has the same storage capability as the total capacity of all main storage loops 21 in FIG. 1.

Thus, if loop 50 has a storage capacity of 4,096 words of 32 bits each, for a total of 131,072 ($2^{17}$) bits, memory 20 in FIG. 1 has the same capacity.

The single shift register approach (loop 50 in FIG. 2) would require an average of 65,536 clock periods to access a random bit of data. If memory 20 in FIG. 1 includes 1,024 bits per main storage loop 21 and has 128 such loops around the central auxiliary loop 22 of 1,024 bit positions, there would be the same storage capacity. The average number of clock periods to access a random bit in memory 20 and then restore all bits to their original storage loops would be half the number of bits per main storage loop 21, plus the total number of bits in auxiliary loop 22, plus eight pulses to return the last 8 bits of a word for a total of 1,544 clock periods. This constitutes an improved access time by at least a factor of 40 over that required for the embodiment shown in FIG. 2.

The improvement in access time will vary with different memory designs. The nature of the multiple storage loops encourages grouping of data for low random access times so that exact prediction of access time and total memory cycle time will depend upon what and how information is to be stored and recalled.

The cylindrical domain detector 32 may be, as described in the literature, formed on a magento-optical or a Hall effect sensor or any other device as may be well-known in the magnetic domain sensing art. A generator of cylindrical magnetic domain is described in the previously mentioned article by Bobeck et al.

The cylindrical magnetic domain memory 20 is preferably formed with a technique as is briefly described in the Bobeck et al. article and more specifically set forth in an article entitled "Propagation of Cylindrical Magnetic Domains in Orthoferrites" written by A. J. Perneski and published in the IEEE Transactions on Magnetics, Vol. MAG-5, No. 3, September 1969.

Figure 3:
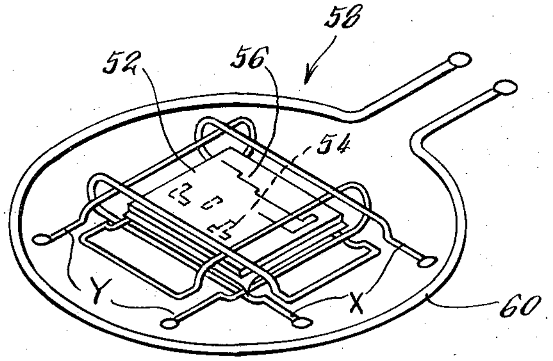
FIG. 3 is a perspective schematic representation of a magnetic structure employed to circulate and control cylindrical magnetic domains.

FIG. 3, which includes portions of FIG. 2 of the latter article by Perneski, shows a thin platelet 52 of orthoferrite material provided with a bar pattern layer 54 of a highly permeable material such as Permalloy. In addition, a pattern 56 of conductors is selectively placed on platelet 52 with respect to several bars on the permalloy layer 54 to effect switching functions as will be further described. A magnetic structure 58 surrounds platelet 52 and includes a generally in-plane current loop 60 to produce a magnetic bias field which is transverse to the surface of the platelet 52. The bais field from loop 60 is selected to have such strength that the magnetic domains remain stable in their cylindrical state.

The magnetic structure 58 further includes an orthogonally oriented pair of current windings labelled X and Y to generate a rotating magnetic field within the plane of orthoferrite platelet 52. The in-plane rotating field is produced by sinusoidal currents sent in phase quadrature with each other through the X and Y windings. The magnetic structure 58 operates on the cylindrical magnetic domain in cooperation with the permalloy bar pattern as described in the Perneski article.

Figures 4, 5, 6, 7:
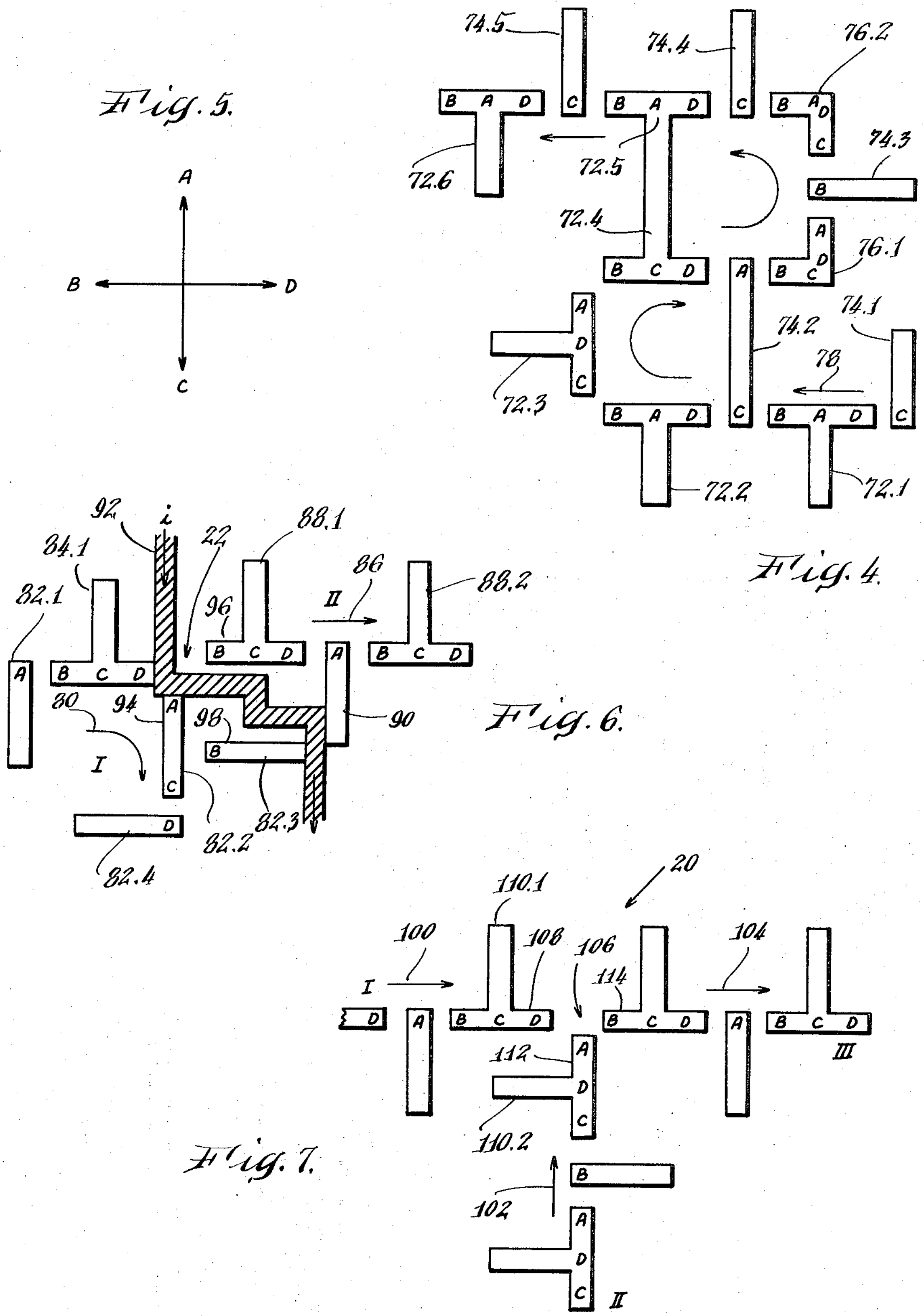
FIG. 4 is a schematic representation of part of a permalloy pattern used to move cylindrical domains under action of a rotating magnetic field.
FIG. 5 is a schematic representation of a rotating magnetic field employed to drive magnetic cylindrical domains.
FIG. 6 is a schematic representation of a switch network used to control the flow of magnetic domains.
FIG. 7 is a schematic representation of an OR junction used in a cylindrical magnetic domain memory in accordance with the invention.

The transfer of cylindrical magentic domains between bars of permalloy may be understood with reference to FIGS. 4 and 5. In FIG. 4 several bars of various shapes such as T's 72, straight bars 74, and L's 76 are shown with a specific orientation relative to an in-plane rotating magnetic field shown in FIG. 5. The bars 72, 74, 76 are further arranged to sequence the cylindrical domains in correspondence with the in-plane magnetic field as it rotates in the sequence of A, B, C, D. The letters in the bar pattern of FIG. 4 show the magnetic domain positions for each of the four orientations of the in-plane magnetic field of FIG. 5. A domain within the ferrite platelet above and in close proximity to the plane of the permalloy bar pattern will be attracted to the most immediate north pole positions when the magnetization of the domain is up from the plane of the drawing.

Thus, a cylindrical domain starting at straight bar 74.1 follows the path indicated by arrow 78 and is circulated around T bars 72.2, 72.3, 72.4 and L bar 76.1 towards the upper left of the pattern to T bar 72.6.

FIG. 6 illustrates a switch such as 22. Switch 22 includes a first normally followed bar pattern path suggested by arrow 80 and includes straight bar 82.1, 82.2, 82.3 and T bar 84.1. An alternate bar path is suggested by arrow 86 and is formed of T bar 88.1, straight bar 90 and T bar 88.2. A current carrying conductor 92 is shown passing adjacent position 94 on bar 82.2 and between it and position 96 on T bar 88.1.

The operation of switch 22 is as follows. Assume that a cylindrical domain under action by the in-plane magnetic field follows the normal route indicated by arrow 80 and arrives at position 94 when that is given a north magnetic pole by the inplane magnetic field. Normally, when position 98 on straight bar 82.3 becomes a north pole, the domain will be driven towards and onto position 98 and, as the in-plane field continues to rotate, the domain will continue along path 80.

If, however, a current pulse is sent through conductor 92 at about the time the domain is at position 94, the domain will be pulled towards position 96, and, as the field rotates towards orientation B, will continue along the new path 86. The pulse through conductor 92 preferably is timed to occur while the magnetic in-plane field is within about 30° after passing its "A" orientation.

Note that the current pulse will not have any switching effect unless it occurs while a domain has landed at position 94. Hence a current pulse through conductor 92 at another time, such as when the in-plane field is at or close beyond orientation C, will have no switching effect. The same conductor 92 may thus be used to operate different switches provided they do not have to be operated at the same time relative to the cycle of the in-plane field.

FIG. 7 shows a bar pattern for an OR gate such as 25 wherein domains traveling along paths 100 or 102 continue along a common path 104. The critical region is at junction 106 where a domain at position 108 of T bar 110.1 is jumped to position 112 of T bar 110.2 and then continues on path 104. Similarly, a domain arriving on position 112 along path 102 continues on to position 114 and path 104. Care must be taken that two domains do not arrive on positions 108 and 112 simultaneously since OR gate 25 is not defined for such condition.

Figure 8:
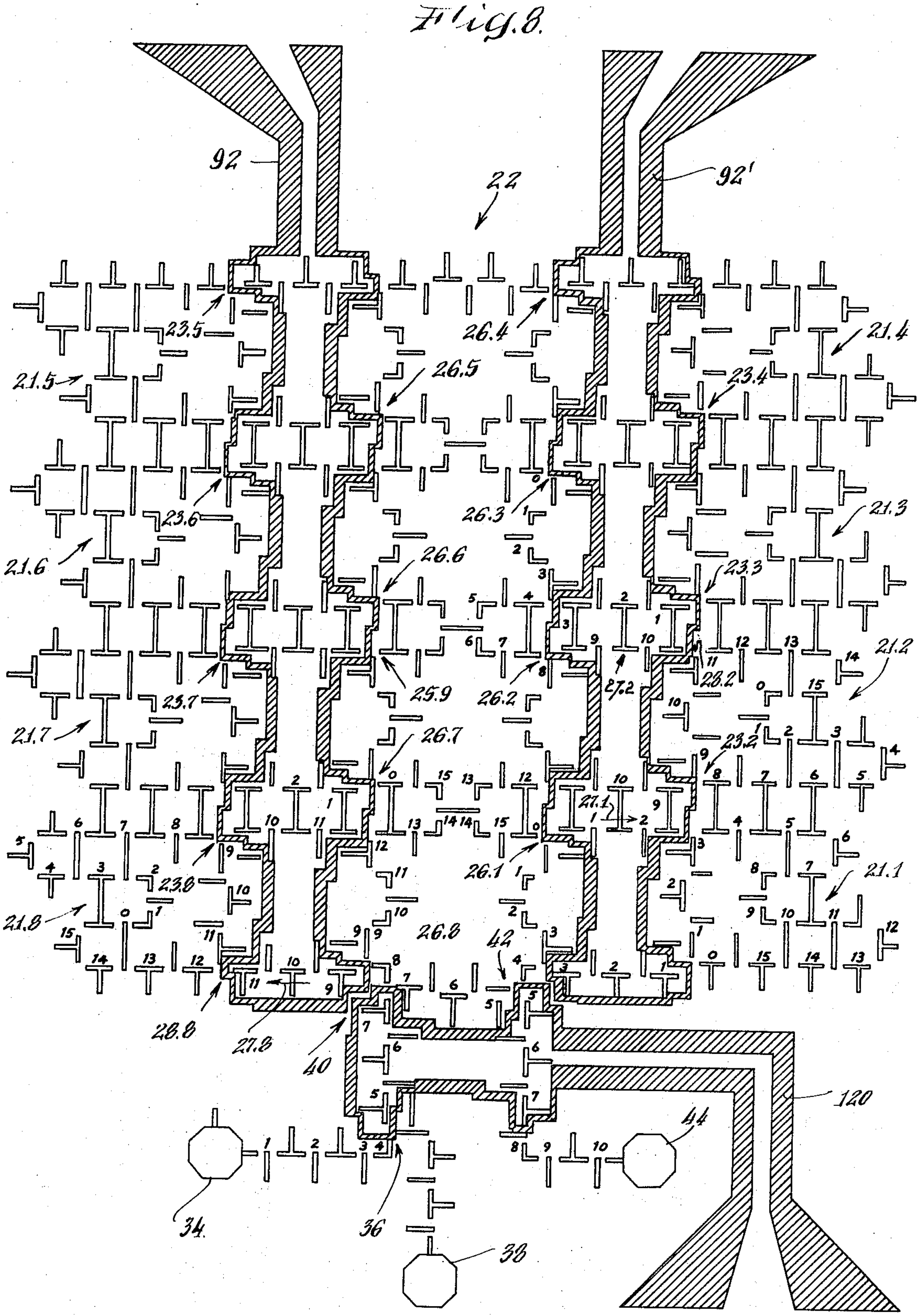
FIG. 8 is a schematic representation of a permalloy pattern and conductor network used to produce a cylindrical magnetic domain memory as shown in FIG. 1.

FIG. 8 shows a permalloy bar pattern and conductor switch network employed to produce a cylindrical magnetic domain memory 20 as shown in FIG. 1 in accordance with the invention. There are eight main storage loops 21, each of which can circulate 16 cylindrical domains. The positions of the domains in storage loops 21 are indicated with the numerals 0 through 15 which identify domain positions at the end of one full rotational cycle of the in-plane magnetic field. Conductors 92 and 92' are shown placed as two separate conductors to form the switches 23 and 26 in the manner as described with reference to FIG. 6. The switches 36 and 42 are formed with conductor 120.

When a given word is to be accessed, a sequence of appropriate pulses are sent on conductors 92–92' to energize all switches 23 at just the right time. The bits will then enter the auxiliary loop 22 and circulate around past switches 26 and 42, OR gates 40 and 25 and read-out device 32 (shown in FIG. 1). In the embodiment shown in FIG. 8, there are 8 bit positions along auxiliary loop 22 between adjacent entry points at OR gates 25. Hence, eight successive pulses applied to switches 23 will enter a total of 64 bits onto auxiliary loop 22.

A particularly advantageous feature of a memory in accordance with the invention is that after all bits have traveled around auxiliary loop 22 and past the read-out device 32, they can be reinserted into their original positions on main storage loops 21. This is obtained by selecting the bit-lengths of auxiliary loop 22 and transfer tracks such as 24 and 27.

Thus, when auxiliary loop 22 has a bit-length which is equal to an integral multiple of a desired number of bit positions on each main storage loop 21, then the domains can circulate any number of times around auxiliary loop 22. The bit lengths of transfer tracks 24 and 27 are so chosen that bit transfers may be made without falling out of step with bits left in either a loop 21 or loop 22. Hence, a bit position labeled 10 in loop 21.2 will arrive at OR gate 28.2 at the same time its corresponding bit position 10 on transfer tracks 27.2.

A memory such as described with reference to FIGS. 1 and 8 was built on a ferrite platelet of 1.5 mil thickness and formed of $Sm_{0.55}Tb_{0.45}Fe_3^0$. A permalloy layer formed of 81% Ni and 19% Fe was placed on the platelet with bars that had dimensions of the order of 0.001 inches wide by 0.005 inches long with 5,000 A thickness. The aluminum conductor pattern was 4000. A thick and generally 0.001 inches wide. The bias field was controlled to provide cylindrical domains from 0.001 to 0.002 inches in diameter. Circulation and switching of domains were respectively obtained with a driving in-plane field of about 20 oersteds and 10 microsecond current pulses of about 20 milliamperes. Drive frequencies for the in-plane field in the kilocycle range provided satisfactory operation. Note that groups of oppositely oriented switches such as 23.5–23.8 and 26.5–26.8 can be operated independently from a common conductor circuit 92 by selectively timing the current pulse.

Having thus described a cylindrical magnetic domain memory in accordance with the invention its advantages may be appreciated. Rapid access of random bits is obtained by using a plurality of main storage loops for circulating cylindrical domains and an auxiliary loop to pass selected domains for read-out or updating. By removing several bits from each storage loop simultaneously, the need to control transfer to and from any single loop individually is avoided. Thus, the number of control circuits and lead wires to memory is minimized. Data selection is achieved by timing of the sequence of transfer pulses.

What is claimed is:

1. A rapid access cylindrical magnetic domain memory comprising a cylindrical magnetic domain sustaining and position controlling structure including means for producing a plurality of cylindrical domain paths having sequentially spaced discrete stable cylindrical domain bit positions, and means for advancing the cylindrical domains along the tracks, said path producing means including a plurality of main storage cylindrical domain circulating loops and an auxiliary cylindrical domain circulating loop having a bit length selected to accommodate a predetermined number of bits from each of the main storage circulating loops, said path producing means further including infeed paths each for conducting cylindrical domains along discrete stable cylindrical domain positions to a main storage loop and separate outfeed paths each for conducting cylindrical domains along discrete stable cylindrical domain positions to the auxiliary loop from a main storage loop, with the number of discrete stable cylindrical domain positions in each of the infeed and outfeed paths coupled to a common main storage loop being selected to provide domain position synchronization between the main storage loops and the auxiliary loop for each full domain circulation around the auxiliary loop, switching means for coupling cylindrical domains in each of the main storage circulating loops to the auxiliary loop and for returning cylindrical domains to the main storage loops from the auxiliary loop, means for detecting cylindrical domains being circulated around the auxiliary loop, means for selectively introducing and disposing of cylindrical domains traveling along the auxiliary loop to alter information represented by the cylindrical domains in the main storage loops.

2. The rapid access cylindrical magnetic domain memory as claimed in claim 1 wherein the means for advancing of the cylindrical domains further includes means for producing an in-plane rotating magnetic field which rotates at a desired frequency, means for producing a first switch current pulse during a first selected portion of the rotational cycle of the in-plane rotating magnetic field and a second current pulse during a second selected portion of the rotational cycle, both of said current pulses being selectively applied to the switching means to respectively transfer cylindrical domains between the main storage loops and the auxiliary loop.

3. The rapid access cylindrical magnetic domain memory as claimed in claim 1 wherein the bit length of the auxiliary circulating loop is selected equal to a whole multiple of the sum of the number of predetermined bits transferred from each main storage circulating loop.

4. The rapid access cylindrical magnetic domain memory as claimed in claim 1 wherein the track producing means includes a plurality of highly permeable bars sequentially arranged to form discrete stable cylindrical domain positions, and wherein said cylindrical domains advancing means includes means for producing an in-plane rotating magnetic field with the highly permeable bars each bearing a predetermined orientation with respect to an instantaneous orientation of the in-plane rotating magnetic field, and wherein said switching means further includes conductor loops selectively located adjacent predetermined highly permeable bars at junctions between the main storage circulating loops and the auxiliary loop to cause a selected change in the travel of the cylindrical domains upon the transmission of current pulses along the conductor loop, and means for producing first and second current pulses during respectively different and selected time periods of a rotational cycle of the in-plane magnetic field and applying the first and second pulses to the switching means to control the transfer of cylindrical domain between the main storage loops and the auxiliary loop.

5. A rapid access cylindrical magnetic domain memory comprising a plurality of main storage loops and an auxiliary loop, each loop being formed of a plurality of bars of highly permeable material in close proximity to a thin magnetic cylindrical domain sustaining platelet, a magnetic domain sustaining structure including means for producing a bias magnetic field applied transverse to a surface of the platelet for stable cylindrical domains and means producing a rotating magnetic field within the plane of the thin platelet to drive the cylindrical domains from bar to bar, said auxiliary loop having separate infeed and outfeed transfer tracks with one of said infeed and one of said outfeed transfer tracks being coupled to each of the main storage cylindrical domain circulating loops, said auxiliary loop having a number of bit positions selected to accommodate a predetermined whole multiple of the number of bits transferred from each main storage loop, and further having a number of bit positions selected to provide domain position synchronization between the auxiliary loop and each main storage loop, and a cylindrical domain detector arranged to detect domains in the auxiliary loop.

6. The rapid access cylindrical magnetic domain memory as claimed in claim 5 and further including a conductor pattern deposited on the platelet with selective proximity to predetermined bars to form domain path switches actuated by current pulses applied to the conductor pattern.

7. The rapid access cylindrical magnetic domain memory as claimed in claim 6 wherein said conductor pattern is deposited in switching proximity with bars of different orientations relative to the in-plane domain driving magnetic field to enable the same conductor to provide a plurality of switches.

8. The rapid access cylindrical magnetic domain memory as claimed in claim 7 wherein said conductor pattern includes a disposal and update conductor circuit arranged to respectively divert cylindrical domains from the auxiliary loop and introduce new cylindrical domains into the auxiliary loop, means for disposing diverted cylindrical domains, and means for generating new cylindrical domains to introduce new cylindrical domains in to the auxiliary loop.

* * * * *

Notice of Adverse Decision in Interference

In Interference No. 99,196, involving Patent No. 3,806,901, C. F. Buhrer, RAPID ACCESS CYLINDRICAL MAGNETIC DOMAIN MEMORY, final judgment adverse to the patentee was rendered Sept. 1, 1977, as to claims 5 and 6.

[*Official Gazette December 20, 1977.*]